US009240055B1

(12) United States Patent
Liu et al.

(10) Patent No.: US 9,240,055 B1
(45) Date of Patent: Jan. 19, 2016

(54) SYMMETRY-BASED INTERPOLATION IN IMAGES (71) Applicant: Google Inc., Mountain View, CA (US)

(72) Inventors: Yanxi Liu, University Park, PA (US); Arthur Robert Pope, Palo Alto, CA (US); Vivek Verma, Oakland, CA (US); Stephen Charles Hsu, San Carlos, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/487,650

(22) Filed: Sep. 16, 2014

(51) Int. Cl.
G06K 9/40 (2006.01)
G06K 9/46 (2006.01)
G06T 7/60 (2006.01)
G06K 9/52 (2006.01)
G06T 11/60 (2006.01)

(52) U.S. Cl.
CPC . *G06T 7/608* (2013.01); *G06K 9/52* (2013.01); *G06T 11/60* (2013.01); *G06K 2009/4666* (2013.01)

(58) Field of Classification Search
None
See application file for complete search history.

(56) References Cited

U.S. PATENT DOCUMENTS 8,009,899 B2 * 8/2011 Chen et al. .................... 382/154
8,670,630 B1 3/2014 Kwatra
8,737,723 B1 5/2014 Kwatra
9,014,500 B2 * 4/2015 Shuster et al. ................ 382/254
2009/0028389 A1 * 1/2009 Edanami ....................... 382/104
2012/0120192 A1 5/2012 Alregib et al.
2014/0023289 A1 1/2014 Jung et al.

OTHER PUBLICATIONS

Liu et al., "Image De-fencing", 2008, <http://cs.brown.edu/~hays/papers/DF.pdf>.
Park et al., "Image De-fencing Revisited", 2010, <http://vision.cse.psu.edu/publications/pdfs/2010park2.pdf>.
Korah et al., "Analysis of Building Textures for Reconstructing Partially Occluded Facades", 2008, <http://nameless.cis.udel.edu/pubs/2008/KR08/eccv2008.pdf>.
Criminisi et al., "Region Filling and Object Removal by Exemplar-Based Image Inpainting", IEEE Transactions on image processing, vol. 13, No. 9, Sep. 2004, <http://research.microsoft.com/pubs/67276/criminisi_tip2004.pdf>.
Liu et al., "Near-Regular Texture Analysis and Manipulation", 2004, <http://cs.brown.edu/~hays/papers/sig04_final.pdf>.

(Continued)

*Primary Examiner* — Daniel Mariam
(74) *Attorney, Agent, or Firm* — Lerner, David, Littenberg, Krumholz & Mentlik, LLP (57) ABSTRACT

The aspects described herein relate to replacing pixels in images in order to remove obstructions from images. In one example, an image of a scene having symmetrical features and image information identifying at least one pixel of the image corresponding to a hole to be filled may be received. This hole may correspond to an obstruction in the image. A set of symmetry axes may be identified based on the symmetrical features. A symmetry map identifying correspondences between different pixels in the image based on the set of symmetry axes may be generated. A correspondence between the at least one pixel corresponding to a hole to be filled and a second pixel of the image is identified based at least in part on the symmetry map and the image information. The at least one pixel may be altered based on the identified correspondence in order to remove the obstruction.

20 Claims, 9 Drawing Sheets

(56) References Cited

OTHER PUBLICATIONS

Efros et al., "Image Quilting for Texture Synthesis and Transfer", 2001, <http://people.csail.mit.edu/billf/papers/efrosFreeman.pdf>.

Wang et al., "A Hole-Filling Strategy for Reconstruction of Smooth Surfaces in Range Images", 2003, <http://www.inf.ufrgs.br/~oliveira/pubs_files/WangJ_OliveiraM_Hole_Filling.pdf>.

Liu et al., "Deformable Texture: the Irregular-Regular-Irregular Cycle", 2003, <https://www.ri.cmu.edu/pub_files/pub4/liu_yanxi_2003_10/liu_yanxi_2003_10.pdf>.

Loy et al., "Detecting Symmetry and Symmetric Constellations of Features", ECCV 2006, Part II, LNCS 3952, pp. 208-521, 2006, <http://www.cse.psu.edu/~yanxi/CourseFall2006_files/loy_eccv2006.pdf>.

Podolak et al., "The Planar-Reflective Symmetry Transform", 69 pages, 2006, <http://gfx.cs.princeton.edu/pubs/Podolak_2006_APS/Siggraph2006.ppt>.

Boykov et al., "Fast Approximate Energy Minimization via Graph Cuts", IEEE transactions on PAMI, vol. 20, No. 12, p. 1222-1239, Nov. 2001, <http://www.csd.uwo.ca/faculty/olga/Papers/pami01_final.pdf>.

Pereira et al., "Symmetry-Based Completion", 2009, <http://www.visgraf.impa.br/Data/RefBib/PS_PDF/grapp09/completion_grapp.pdf>.

\* cited by examiner

SYMMETRY-BASED INTERPOLATION IN IMAGES

BACKGROUND

Various systems may provide users with images of different locations. For example, these images may include aerial images, satellite images, street level images, etc. Some of these street level images may provide a panoramic view of a location. Thus, these street level images may provide users with a higher resolution of street-scenes than aerial or satellite views. However, these street level images are more likely to have static and mobile obstacles such as street-side vegetation, parked vehicles, moving vehicles, pedestrians, cyclists, etc.

Such obstacles may become even more evident when the images are used to generate 3D models of various scenes. For example, trees and vehicles may prevent the images from capturing areas behind these obstacles relative to the camera. Thus, when the images are used to generate a 3D model, the areas behind these obstacles would not necessarily be visible or included in the 3D model. This may make the model appear incomplete to a user viewing the model.

SUMMARY

Aspects of the disclosure provide a computer-implemented method. The method includes receiving, by one or more computing devices, an image of a scene having symmetrical features; receiving, by the one or more computing devices, image information identifying at least one pixel of the image corresponding to an obstruction in the image; identifying, by the one or more computing devices, a set of symmetry axes based on the symmetrical features of the scene; generating, by one or more computing devices, a symmetry map identifying correspondences between different pixels in the image based on the set of symmetry axes; identifying, by the one or more computing devices, a correspondence between the at least one pixel corresponding to a hole to be filled and a second pixel of the image based at least in part on the symmetry map and the image information; altering, by the one or more computing devices, the at least one pixel based on the identified correspondence in order to provide an output image where the obstruction appears to be at least partially removed from the image.

In one example, the image is an orthographic view of a portion of the scene. In another example, each given symmetry axis of the set of symmetry axes is associated with a confidence value indicating a confidence in the given symmetry axis, and identifying the correspondence is further based on the confidence value. In another example, the method also includes using the symmetry map and image information to identify a correspondence between the at least one pixel corresponding to a hole to be filled and a third pixel of the image and before altering the at least one pixel corresponding to a hole to be filled, selecting the second pixel over the third pixel based on a first symmetry axis of the set of symmetry axes associated with the first correspondence and a symmetry axis of the set of symmetry axes associated with the second correspondence. In this example, each given symmetry axis of the set of symmetry axes is associated with a strength score indicating a confidence in the given symmetry axis and the selecting is further based on the strength scores of the first symmetry axis and the second symmetry axis. Alternatively, the selecting is further based on (1) a first number of symmetry axes of the set of symmetry axes between the at least one pixel corresponding to a hole to be filled and the second pixel in the image and (2) a second number of symmetry axes of the set of symmetry axes between the at least one pixel corresponding to a hole to be filled and the third pixel in the image.

In another alternative, the selecting is further based on a color of a neighboring pixel of the at least one pixel corresponding to a hole to be filled. In another example, the method also includes using the symmetry map and the image information to identify a correspondence between the at least one pixel corresponding to a hole to be filled and a third pixel of the image and before altering the at least one pixel corresponding to a hole to be filled, selecting the second pixel over the third pixel using a cost-function and graph cut energy minimization. In another example, the altering includes using the color of the second pixel to fill the at least one pixel. In another example, identifying the set of symmetry axes includes identifying symmetry axes that are either horizontal or perpendicular to a gravity gradient for the image. In another example, the symmetry map is generated as a probability map based on a dense pixel-wise analysis of the image with respect to each symmetry axis of the set of symmetry axes. In another example, the symmetry map is generated such that the symmetry map identifies whether any holes of the image information can be filled, for each pixel of the image a number of pixel correspondences to different pixels in the street level image, and for each pixel of the image a location of any corresponding pixel and a likelihood value for any corresponding pixels, wherein each likelihood value indicates a strength of the correspondence. In another example, the image information includes a binary image where binary values of the binary image identify the at least one pixel. In another example, the at least one pixel corresponds to a and at least one pixel is altered by interpolating a pixel value for the at least one pixel in the output image based on the correspondence. In another example, the method also includes using the at least one altered pixel to complete a texture of a surface of a 3D model of the scene.

Another aspect of the disclosure provides a system comprising one or more computing devices configured to receive an image of a scene having symmetrical features; receive image information identifying at least one pixel of the image corresponding to an obstruction in the image; identify a set of symmetry axes based on the symmetrical features of the scene; generate a symmetry map identifying correspondences between different pixels in the image based on the set of symmetry axes; identify a correspondence between the at least one pixel corresponding to a hole to be filled and a second pixel of the image based at least in part on the symmetry map and the image information; and alter the at least one pixel based on the identified correspondence in order to provide an output image where the obstruction appears to be at least partially removed from the image.

In one example, the one or more computing devices are also configured to use the symmetry map and image information to identify a correspondence between the at least one pixel corresponding to a hole to be filled and a third pixel of the image and before altering the at least one pixel corresponding to a hole to be filled, select the second pixel over the third pixel based on a first symmetry axis of the set of symmetry axes associated with the first correspondence and a symmetry axis of the set of symmetry axes associated with the second correspondence. In this example, each given symmetry axis of the set of symmetry axes is associated with a strength score indicating a confidence in the given symmetry axis and the one or more computing devices are further configured to select the second pixel over the third pixel further based on the strength scores of the first symmetry axis and the second symmetry axis. As an alternative, the one or more computing devices are further configured to select the second pixel over the third pixel further based on (1) a first number of symmetry axes of the set of symmetry axes between the at least one pixel corresponding to a hole to be filled and the second pixel in the image and (2) a second number of symmetry axes of the set of symmetry axes between the at least one pixel corresponding to a hole to be filled and the third pixel in the image.

A further aspect of the disclosure provides a non-transitory, tangible machine readable medium on which instructions are stored. The instructions, when executed by one or more processors, cause the one or more processors to perform a method. The method includes receiving an image of a scene having symmetrical features; receiving image information identifying at least one pixel of the image corresponding to an obstruction in the image; identifying a set of symmetry axes based on the symmetrical features of the scene; generating a symmetry map identifying correspondences between different pixels in the image based on the set of symmetry axes; identifying a correspondence between the at least one pixel corresponding to a hole to be filled and a second pixel of the image based at least in part on the symmetry map and the image information; and altering the at least one pixel based on the identified correspondence in order to provide an output image where the obstruction appears to be at least partially removed from the image.

DETAILED DESCRIPTION

Overview

The technology relates to hole filling or interpolation in images. For example, street level images may include any number of static and mobile objects such as vegetation, parked or moving vehicles, pedestrians, etc. which obstruct views of other objects such as building facades. In order to allow a user to view obstructed objects from various viewpoints and to see them as complete, these obstructions should be removed and the holes left behind filled. In this regard, the aspects described herein utilize symmetry of objects, such as building facades and other structures, to determine how to fill in such holes to provide the appearance that the obstacle has been removed from the original image. By doing so, the end result may reflect a natural structural regularity in the original street level image.

First an image, such as a street level, aerial or other image, may be collected using a camera. One or more of these images may be processed to provide a planar facade image composed of one or more images that are stitched and rectified to an orthographic view.

The planar facade image may also be processed in order to identify obstructions and corresponding holes. As an example, an image may be reviewed by an operator who identifies the obstructions or automated techniques may be used to identify such obstructions. This information may be converted into a binary image indicating pixels corresponding to the obstructions (or holes) which require interpolation.

In order to perform the interpolation, the planar facade image may be processed to identify symmetry axes. Any known reflection symmetry detection technique may be used to detect symmetries. Each symmetry axis may be labeled by its X-Y end point coordinates. In addition each axis may be associated with a strength score indicating a normalized voting score from corresponding feature descriptor pairs in the input image or a confidence value in that symmetry axis.

The symmetry axes may be used to generate a symmetry map for the planar facade image. This symmetry map may represent the extent in the image of the region of symmetry associated with each symmetry axis. For each symmetry axis, corresponding pixels on either side of the axis are compared to determine the extent of the region of symmetry characterized by that axis. The symmetry map may also include a likelihood value for each correspondence between pixels based upon the strength scores of the symmetry axes.

Using the symmetry map and binary image, whether each hole pixel can be filled by a corresponding pixel of the planar facade image may be determined. As part of this determination, a set of pixel correspondences including the location of any corresponding pixel of the planar facade image may be identified.

When each hole pixel can be filled, the pixel correspondences may also be used to carry out the hole filling or interpolation and provide a final hole-filled or interpolated image. In one example, a fast patch-based recursive approach may be used. Alternatively, a pixel-based graph-cut approach that maximizes smoothness of color transition using a cost function may be used. Post-processing steps may also be used to improve the quality of the interpolation as well as the quality of the final interpolated image.

In the event that there is no corresponding pixel for a given hole pixel, additional techniques may be used. For example, the planar facade image may be processed a second time to identify additional symmetry axes and the other features described above may be repeated. Alternatively, other forms of symmetry such as translation or repeating patterns of pixels or interpolation from neighboring pixels may be used to fill in any such hole pixel.

The features described above may allow for the simultaneous preservation of structural symmetry and local color transition in the image when filling in the holes, something that can be lost when using neighborhood image pixels alone. As such, these features may be especially useful when addressing the issues of a near-regular texture (regular reoccurrence interrupted by systematic or random noise), which may appear in urban scenes, textiles, floor tiling, outdoor tiled area, swimming pools (walls, bottom), garden paths, parking lots, gardens, and other formations of regular or near-regular patterns. The end result of such interpolation may provide a user with a more complete visualization of a scene from different views.

Example Systems

Figure 1:
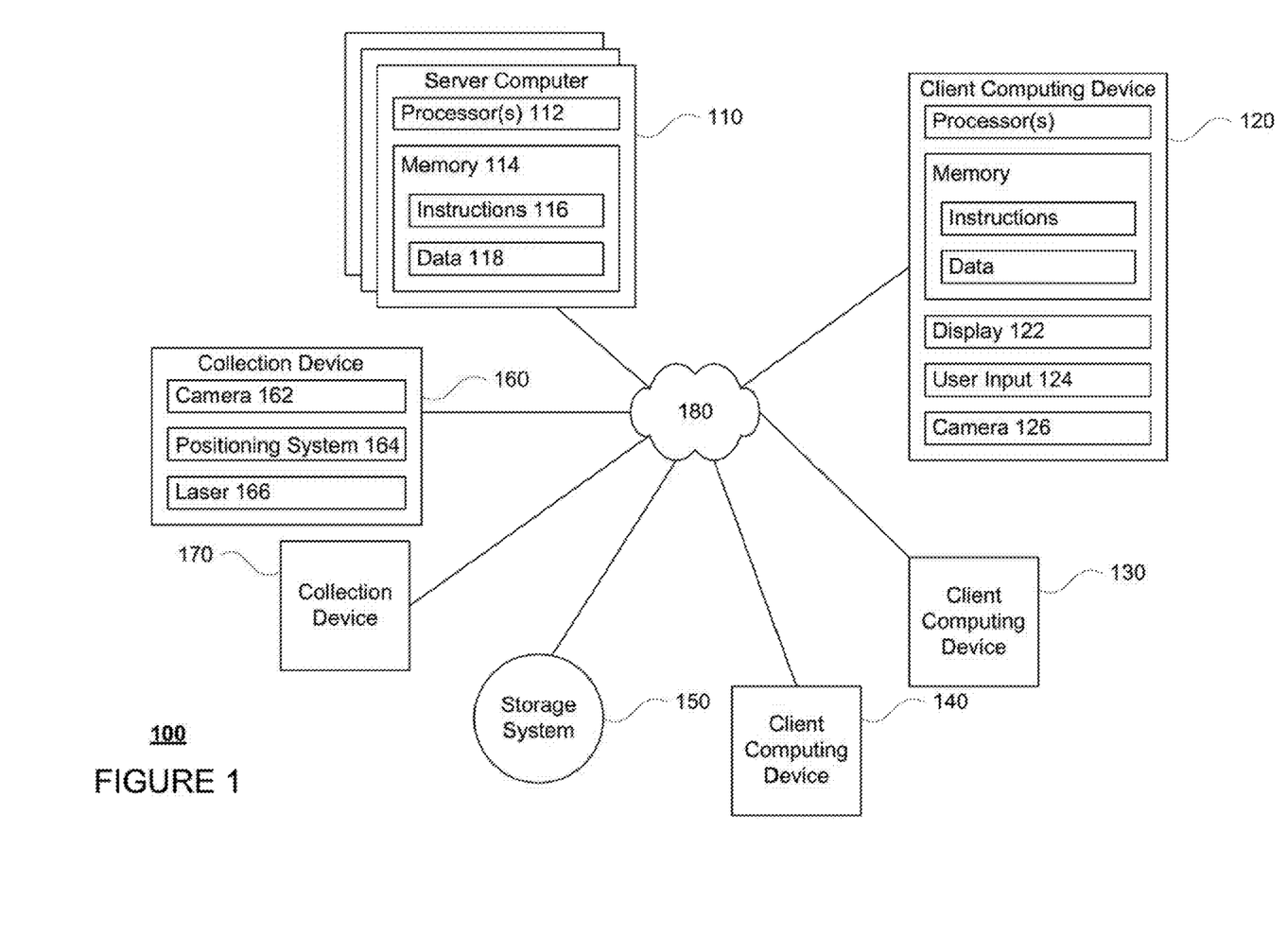
FIG. 1 is a functional diagram of an example system in accordance with aspects of the disclosure.
Figure 2:
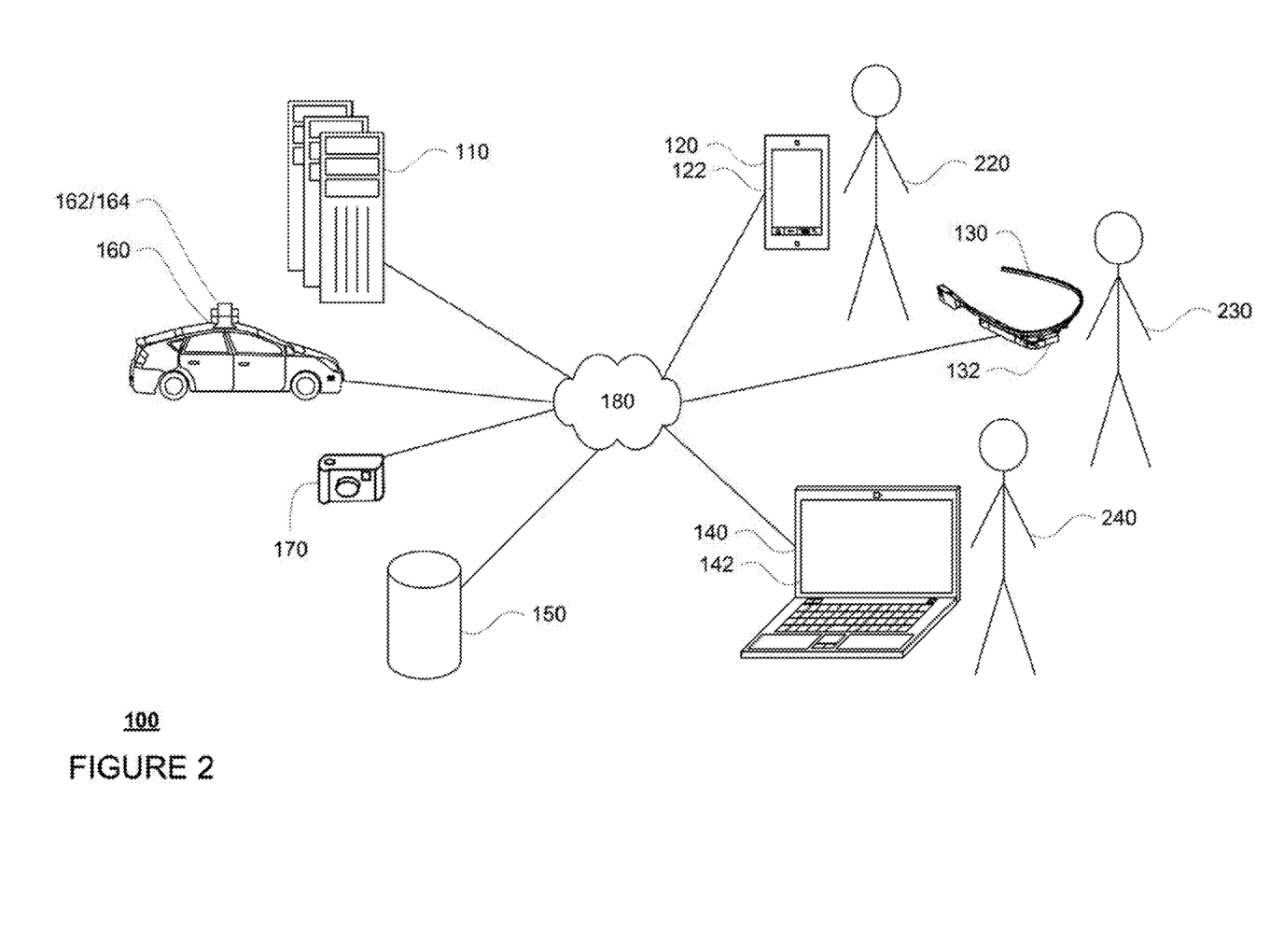
FIG. 2 is a pictorial diagram of the example system of FIG. 1.

FIGS. 1 and 2 include an example system 100 in which the features described herein may be implemented. It should not be considered as limiting the scope of the disclosure or usefulness of the features described herein. In this example, system 100 can include one or more computing devices 110, 120, 130, and 140, storage system 150, as well as collection devices 160 and 170. One or more computing devices 110 can contain one or more processors 112, memory 114 and other components typically present in general purpose computing devices. Memory 114 of the one or more computing devices 110 can store information accessible by one or more processors 112, including instructions 116 that can be executed by the one or more processors 112.

Memory can also include data 118 that can be retrieved, manipulated or stored by the processor. The memory can be of any non-transitory type capable of storing information accessible by the processor, such as a hard-drive, memory card, ROM, RAM, DVD, CD-ROM, write-capable, and read-only memories.

The instructions 116 can be any set of instructions to be executed directly, such as machine code, or indirectly, such as scripts, by the processor. In that regard, the terms "instructions," "application," "steps" and "programs" can be used interchangeably herein. The instructions can be stored in object code format for direct processing by the processor, or in any other computing device language including scripts or collections of independent source code modules that are interpreted on demand or compiled in advance. Functions, methods and routines of the instructions are explained in more detail below.

Data 118 can be retrieved, stored or modified by processor 112 in accordance with the instructions 116. For instance, although the subject matter described herein is not limited by any particular data structure, the data can be stored in computer registers, in a relational database as a table having many different fields and records, or structured (e.g., XML documents). The data can also be formatted in any computing device-readable format such as, but not limited to, binary values, ASCII or Unicode. Moreover, the data can comprise any information sufficient to identify the relevant information, such as numbers, descriptive text, proprietary codes, pointers, references to data stored in other memories such as at other network locations, or information that is used by a function to calculate the relevant data.

The one or more processors 112 can include any conventional processors, such as a commercially available CPU. Alternatively, the processor can be a dedicated component such as an ASIC or other hardware-based processor. Although not necessary, one or more computing devices 110 may include specialized hardware components to perform specific computing processes, such as decoding video, matching video frames with images, distorting videos, encoding distorted videos, etc. faster or more efficiently.

Although FIG. 1 functionally illustrates the processor(s), memory, and other elements of computing device 110 as being within the same block, the processor, computer, computing device, or memory can actually comprise multiple processors, computers, computing devices, or memories that may or may not be stored within the same physical housing. For example, the memory can be a hard drive or other storage media located in one or more housings different from those of the one or more computing devices 110. Accordingly, references to a processor, computer, computing device, or memory will be understood to include references to a collection of processors, computers, computing devices, or memories that may or may not operate in parallel. For example, the computing devices 110 may include server computing devices operating as a load-balanced server farm. Yet further, although some functions described below are indicated as taking place on a single computing device having a single processor, various aspects of the subject matter described herein can be implemented by a plurality of computing devices, for example, communicating information over network 180.

The one or more computing devices 110 can be at various nodes of a network 180 and capable of directly and indirectly communicating with other nodes of network 180. Although only a few computing devices are depicted in FIGS. 1-2, it should be appreciated that a typical system can include a large number of connected computing devices, with each different computing device (as well as collection device) being at a different node of the network 180. The network 180 and intervening nodes described herein can be interconnected using various protocols and systems, such that the network can be part of the Internet, World Wide Web, specific intranets, wide area networks, or local networks. The network can utilize standard communications protocols, such as Ethernet, WiFi and HTTP, protocols that are proprietary to one or more companies, and various combinations of the foregoing. Although certain advantages are obtained when information is transmitted or received as noted above, other aspects of the subject matter described herein are not limited to any particular manner of transmission of information.

As an example, the one or more computing devices 110 may include one or more web servers that are capable of communicating with storage system 150 as well as computing devices 120, 130, and 140 via the network. For example, one or more server computing devices 110 may use network 180 to transmit and present information to a user, such as user 220, 230, or 240, on a display, such as displays 122, 132, or 142 of computing devices 120, 130, or 140. In this regard, computing devices 120, 130, and 140 may be considered client computing devices and may perform all or some of the features described below.

Each of the client computing devices may be configured similarly to the server computing devices 110, with one or more processors, memory and instructions as described above. Each client computing device 120, 130 or 140 may be a personal computing device intended for use by a user 220, 250, 250, and have all of the components normally used in connection with a personal computing device such as a central processing unit (CPU), memory (e.g., RAM and internal hard drives) storing data and instructions, a display such as displays 122, 132, or 142 (e.g., a monitor having a screen, a touch-screen, a projector, a television, or other device that is operable to display information), and user input device 124 (e.g., a mouse, keyboard, touch-screen or microphone). The client computing device may also include a camera for recording video streams, speakers, a network interface device, and all of the components used for connecting these elements to one another.

Although the client computing devices 120, 130 and 140 may each comprise a full-sized personal computing device, they may alternatively comprise mobile computing devices capable of wirelessly exchanging data with a server over a network such as the Internet. By way of example only, client computing device 120 may be a mobile phone or a device such as a wireless-enabled PDA, a tablet PC, or a netbook that is capable of obtaining information via the Internet. In another example, client computing device 130 may be a head-mounted computing system. As an example the user may input information using a small keyboard, a keypad, microphone, using visual signals with a camera, or a touch screen.

Storage system 150 may store various types of information. As described in more detail below, the storage system 150 may store various images. At least some of these images may be panoramic images having a field of view which is greater than that of the human eye, e.g., 180 degrees or greater. In addition, each image may be associated with geographic location information indicating the location (such as latitude and longitude or other location coordinates) and, in some cases, the orientation (heading) at which the image was captured (e.g., which part of the image is oriented towards "North", etc.) as well as timestamp information indicating the date and time at which the image was captured.

The storage system 150 may also store 3D geometry data. As explained above and described in more detail below, this 3D geometry data may correspond to points on the surface of any objects in the images of storage system 150. The 3D geometry data may provide the position (x,y,z) of points relative to a particular coordinate system (e.g. relative to a position of a LIDAR system that generated the geometry data or a global positioning system (GPS) such as latitude, longitude, and altitude coordinates).

As with memory 114, storage system 150 can be of any type of computerized storage capable of storing information accessible by server 110, such as a hard-drive, memory card, ROM, RAM, DVD, CD-ROM, write-capable, and read-only memories. In addition, storage system 150 may include a distributed storage system where data is stored on a plurality of different storage devices which may be physically located at the same or different geographic locations. Storage system 150 may be connected to the computing devices via the network 180 as shown in FIG. 1 and/or may be directly connected to or incorporated into any of the computing devices 110-140 (not shown).

Collection devices 160 and 170 may include a computing device, configured similarly to one of the server computing devices or client computing devices with a processor and memory storing data and instructions (not shown in FIG. 1 for simplicity). Collection device 160 and 170 may also provide all or some of the images of storage system 150.

Each of the collection devices 160 and 170 may include a camera or other information collection device. For example, collection device 160 may include a camera 162 mounted on a vehicle. As the vehicle is driven along a street, the camera of collection device 160 may capture images. In this regard, all or some of the images of storage system 150 may be considered "street level images." As another example, collection device 170 may include a camera rig attached to a backpack (e.g., for paths and other non-street areas), a smartphone camera, a dedicated camera device, etc. which a person walks, bikes, or otherwise moves around with in order to capture the street level images. In a further example, satellite or aerial images may also be captured by cameras. In addition to capturing images, the collection devices and/or camera may be configured to provide each image with a timestamp indicating the date and time at which the image was captured. The captured images and timestamps may be uploaded or downloaded to the storage system 150.

Each of collection devices 160 or 170 may include a position system 164 in order to determine the camera's relative or absolute position on a map or on the Earth when an image is captured. For example, the position system 164 may include a GPS receiver to determine the device's latitude, longitude and/or altitude position and provide a 2D or 3D location at which each panoramic image was captured by the collection device. Other location systems such as laser-based localization systems, inertial measurement devices, trilateration/triangulation, or camera-based localization techniques may also be used to identify the location of the camera that captured the image. The location of the camera may include an absolute geographical location, such as latitude, longitude, and altitude.

The positioning system 164 may also include other devices in communication with the camera or collection device, such as an accelerometer, gyroscope, or a direction and speed detection device to determine the orientation of the camera 162 when the panoramic image was captured. By way of example only, the positioning system may include a device that determines its pitch, yaw or roll (or changes thereto) relative to the direction of gravity or a plane perpendicular thereto. The device may also track increases or decreases in speed and the direction of such changes.

The collection device's provision of location and orientation data as set forth herein may be associated with the images as they are being captured and provided automatically to the storage system 150, other computing devices and combinations of the foregoing. Although camera 162 and position system 164 are depicted within the collection device 160, these components may or may not be included in the same physical housing. In this regard, the position system 164 may be a different device from the camera 162 such that both components output the 2D or 3D location information and orientation information and panoramic images to the collection device which processes these outputs in order to associate them with one another and provide them to the storage system 150.

In some examples, the collection device 160 may include a LIDAR system 166 including a laser range finder for generating the 3D geometry data described above. For example, as a vehicle is driven along the street, a LIDAR system may be used to generate laser data including measurements of the depth at various points to surfaces in the scene. Using information about the LIDAR system's location and orientation, these depth measurements may be converted to estimates of 3D point locations, and interpolated to estimate the location of continuous surfaces that, in some cases, will be visible in an image that was captured by a camera, such as camera 162, at approximately the same geographic location as the laser data.

Example Methods

The images of storage system 150 (at least some of which are street level images) may be captured by a camera mounted, for example, on a vehicle (or other device). In this regard, street level images, such as panoramic and non-panoramic images, may be captured in a sequence as the camera is moved along. Each image may be associated with 2D or 3D location and orientation information corresponding to the geographic location where the image was captured as well as a timestamp indicating the date and time when the image was captured. For example, as a collection device such as collection device 160 is moved around, such as by driving a vehicle along a street, camera 162 may capture panoramic images. At the same time, the position system 164 may provide GPS or other location coordinates for each image captured by camera 162.

Figure 3:
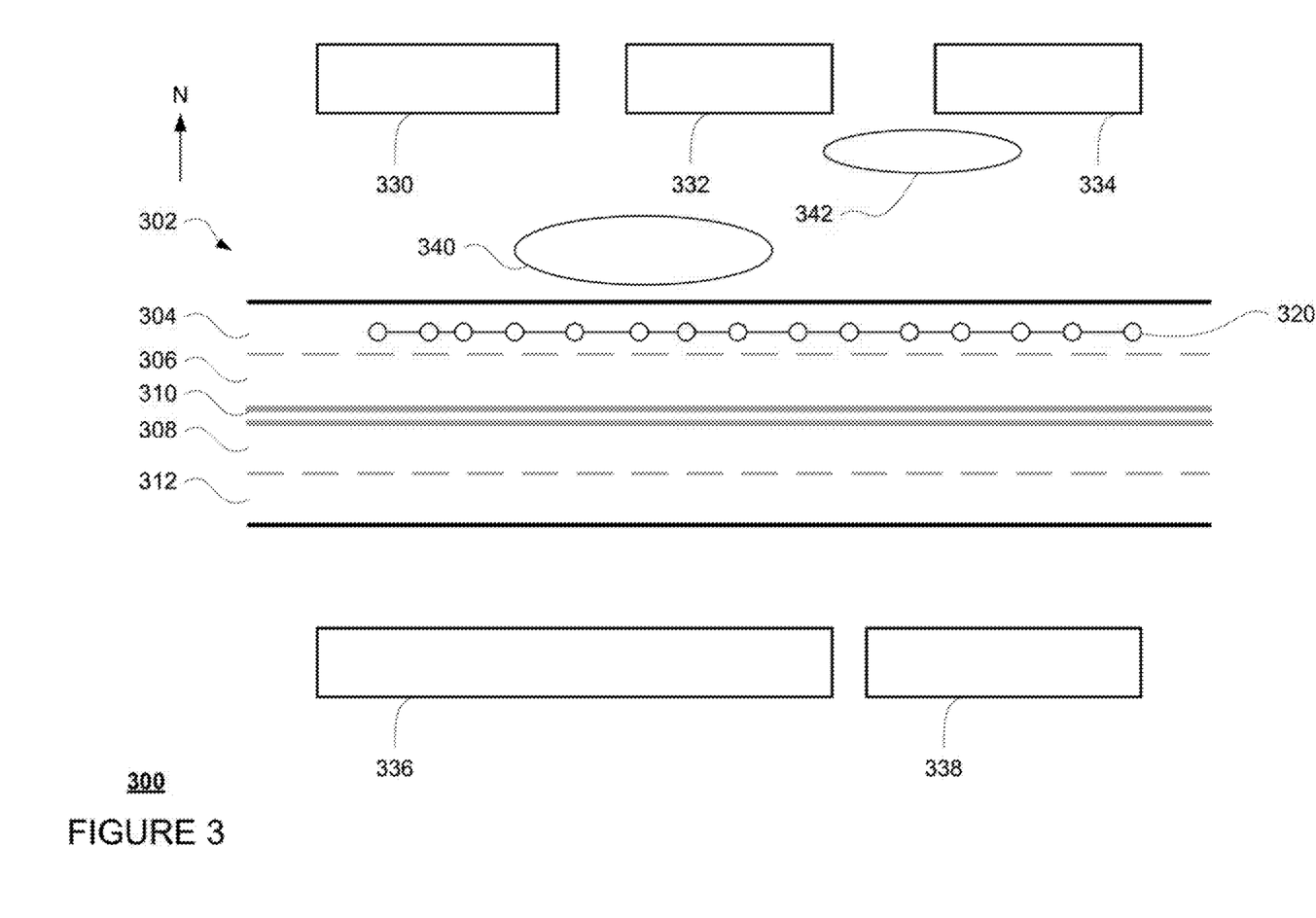
FIG. 3 is an example diagram of image collection locations in accordance with aspects of the disclosure.

FIG. 3 is an example diagram 300 of a birds-eye view of a portion of a street 302 including four lanes 304, 306, 308, and 312. The lanes are divided into two sections by double lane lines 310. Those appearing above double lane lines 310 are westbound lanes, while those below are eastbound.

In this example, the circles of set 320 correspond to the 2D locations (x,y) at which street level images are acquired. These circles or images are arranged into a single path by a camera such as camera 162 of collection device 160 as a vehicle was driven along lane 304 of street 302. In this example, the images of set 320 were captured from the westbound lane 304. These images may be stored in the storage system 150 and retrieved by the one or more computing devices, such as the computing devices 110, as needed.

In addition to the images of the set 320, 3D geometry data corresponding to objects in those images may also be collected and stored in storage system 150. For example, as collection device 160 is driven along the street 302, LIDAR system 166 may be used to collect laser data corresponding to the surfaces of buildings 330-338 as well as other objects such as trees 340 and 342. As noted above, this information may be converted into three dimensional points on the surfaces of those buildings. Thus, this information may describe objects that are included in an image that was captured at approximately the same location as the laser data for example, any of the images of the set 320. In other examples, the 3D geometry may be derived from the collected images using image processing techniques such as structure from motion, photogrammetry or other computer vision algorithms. Though not required, each individual image or the entire set 320 may be associated with its own 3D geometry data. Alternatively, the 3D geometry data may be retrieved from storage using the 2D or 3D location information for a panoramic image.

Figure 4:
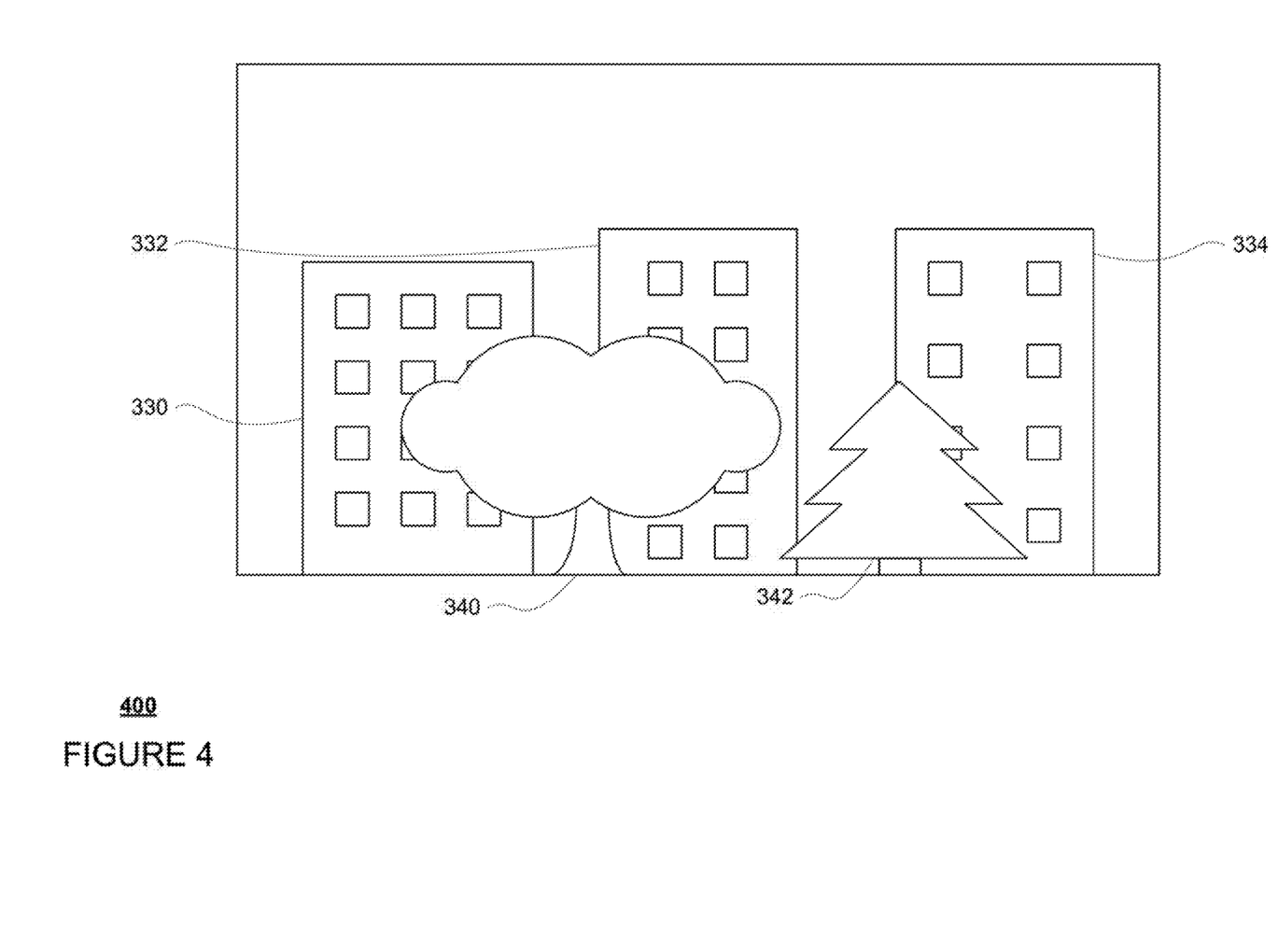
FIG. 4 is an example of an orthographic image in accordance with aspects of the disclosure.

The street level images of set 320 may be processed by the computing devices 110 to provide a planar facade image composed of one or multiple street level images that are stitched and rectified to render an orthographic view. If some surface (e.g., facade) of the building is roughly planar, for example according to the 3D geometry data or based on an assumption that facades are generally planar and aligned with the direction of travel of an adjacent roadway, that surface and the local vertical direction together determine an orthographic view that can be constructed by rectifying and stitching the street level images. In other words, the three dimensional objects such as buildings and trees in an image may be displayed as if they were two dimensional objects. For example, FIG. 4 is a planar facade image 400 including an orthographic view of buildings 330, 332, and 334 as well as trees 340 and 342. In this example, the orthographic projection is chosen so that the ground plane in image 400 is perpendicular to the plane of the page of FIG. 4, or the viewing direction into the page of FIG. 4 is perpendicular to the planar facade of image 400. Such a view may be generated directly from the street level images themselves or with the addition of the 3D geometry data associated with those images using known techniques.

The planar facade image may also be processed by the computing devices 110 in order to identify obstructions. These obstructions may also be identified as holes to be filled. As an example, an image may be reviewed by an operator who identifies the obstructions for example, by tracing, etc. Alternatively, automated techniques may be used to identify obstructions. For example, pattern recognition techniques may be used to identify typical obstructions such as pedestrians, vehicles, vegetation (trees, shrubs, etc.), etc. In other examples, classifiers and object recognition methods may be used to identify portions of images likely to depict objects such as vegetation or vehicles as opposed to buildings. These examples may also be combined with 3D geometry data corresponding to the features in the planar facade image to identify objects that are present in front of a building facade.

Figure 5:
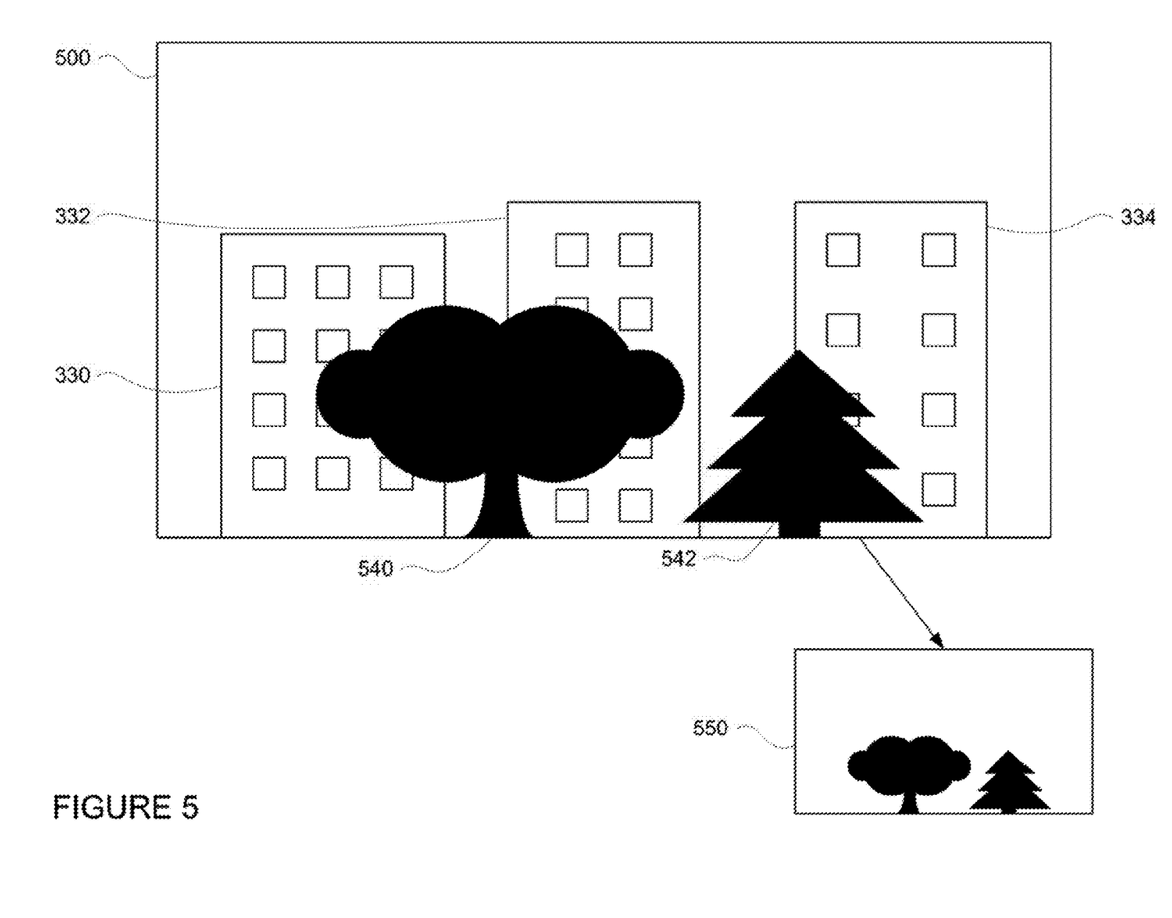
FIG. 5 is an example of an image including holes to be filled and a binary representation of the same in accordance with aspects of the disclosure.

For example, FIG. 5 includes an example image 500 corresponding to the planar facade image 400. However, image 500 includes areas 540, 542 identified as obstructions or holes to be filled. These areas 540 and 542 correspond to the outlines of trees 440 and 442 of planar facade image 400.

The image and any identified obstructions or holes to be filled may be converted into a binary image by the computing devices 110. This binary image may identify or indicate the pixels corresponding to the holes and which require interpolation. For example, FIG. 5 also includes an example binary image 550 corresponding to image 500. In this example, the pixels of areas 540 and 542 are given a first value (for example 1) to indicate that these pixels are holes to be filled or interpolated (shown as black in binary images 550). Similarly, the pixels outside of areas 540 and 542 are given a second value (for example 0) to indicate that these pixels are not holes to be filled or interpolated (shown as white in binary image 550.

Figure 6:
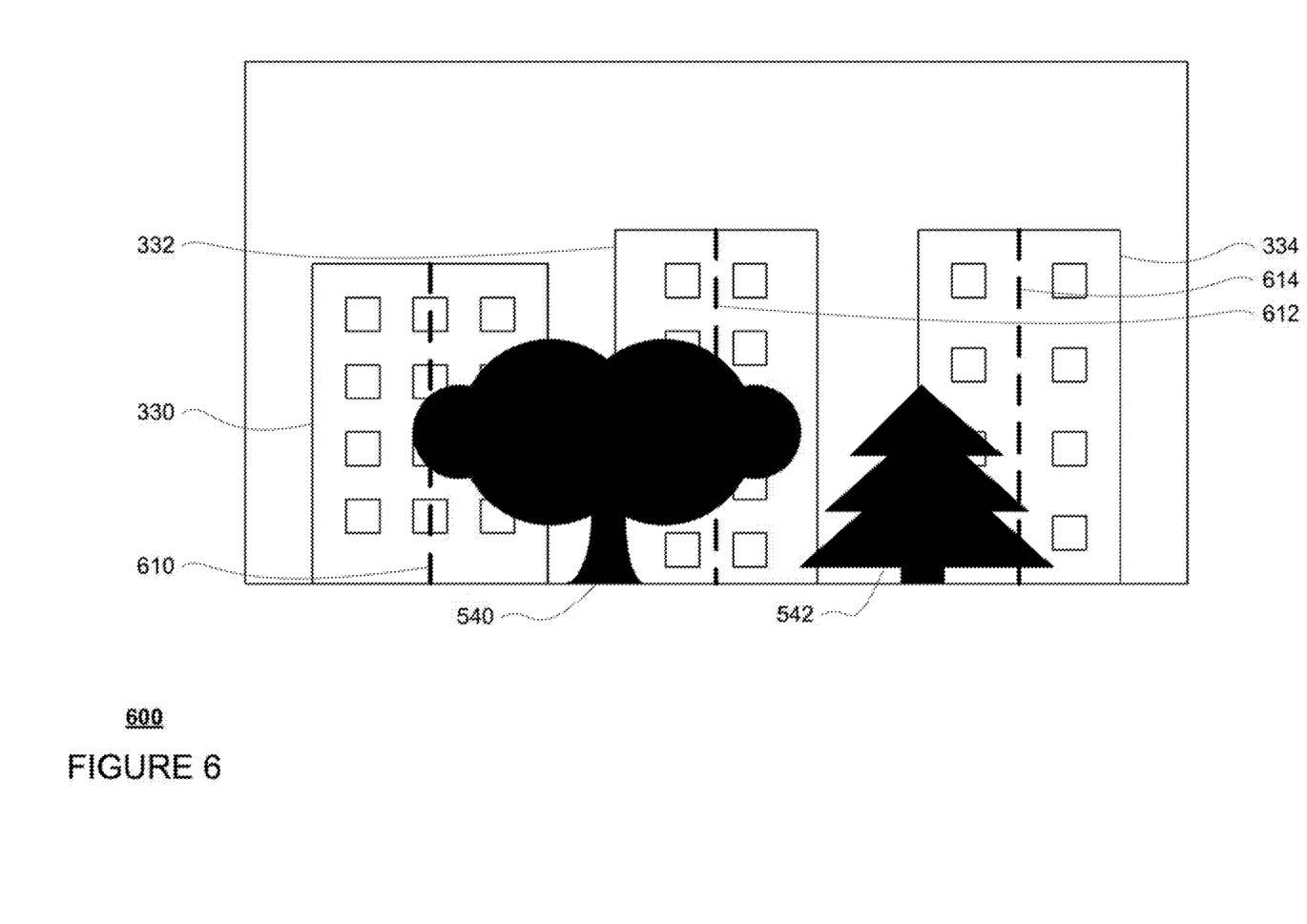
FIG. 6 is an example of an image including symmetry axes in accordance with aspects of the disclosure.

In order to perform the interpolation, the planar facade image may be processed by the computing devices 110 to identify symmetry axes. FIG. 6 is an example image 600 corresponding to images 500 and 400. In this example, image 600 includes three symmetry axes 610, 612 and 614 corresponding to areas of image 600, such as buildings 330, 332, and 334 having symmetrical properties of image features. Although the example of image 600 relates to image 500 including the areas corresponding to holes to be filled, the holes need not be identified in order to identify the symmetry axes.

Any known reflection symmetry detection technique may be used by the computing devices 110 to identify the symmetries of an image rendered as an orthographic view. For example, a method of grouping feature points on the basis of their underlying symmetry and characterizing the symmetries, such as that described by Loy and Elkundh in "Detecting Symmetry and Symmetric Constellations of Features," Proc European Conference on Computer Vision (ECCV), 2006, may be used to identify symmetry axes at various orientations in an image. In this regard, the output of the symmetry analysis may include a discrete sparse symmetry point correspondence map identifying symmetry axes. In some examples, these symmetry axes may be restricted to horizontal or vertical axes with respect to the local gravity gradient in order to simplify the identification of the symmetry axes. Each symmetry axis may be labeled by its X-Y end point coordinates. In addition each axis may be associated with a strength score indicating a normalized voting score from corresponding feature descriptor pairs in the input image or a confidence value in that symmetry axis.

The identified symmetry axes may be used by the one or more computing devices to generate a symmetry map for the planar facade image. As noted above, this symmetry map may represent the extent in the image of the region of symmetry associated with each symmetry axis. Thus, rather than the discrete sparse symmetry point correspondence map, the symmetry map may include a probability map based on a dense pixel-wise analysis of the input image with respect to each reflection symmetry axis.

As an example, a symmetry map may be represented as one mask image for each symmetry axis, or as a single image (or map) in which, at each pixel, there's a list of symmetry axes in which that pixel is considered to be reflected. For each symmetry axis, corresponding pixels on either side of the axis are compared to determine the extent of the region of symmetry characterized by that axis. Small holes in the region are filled (e.g., by image morphology operations).

The symmetry map may also include a likelihood value for each correspondence between pixels based upon the strength scores of the symmetry axes. Thus, the symmetry map may be used to determine whether an image is completely fillable, the number of correspondences for each pixel (including hole pixels as discussed below), and the location and likelihood values for each corresponding pixel. In some examples, the identified symmetry axes can be extended into the holes in order to provide a more robust symmetry map.

Using the symmetry map and binary image, whether each hole pixel can be filled may be determined by the one or more computing devices. For example, by finding the correspondences between image pixels (pixels that are not hole pixels) and hole pixels using the symmetry map, the computing devices may determine whether all of the hole pixels are potentially fillable by one or more image pixels. As part of this determination, a set of pixel correspondences including the location of any corresponding image pixels of the planar facade image may be generated transitively, that is considering relationships between image pixels and symmetry axes of the symmetry map. Here, an image pixel is a pixel that is not a hole pixel. As an example, a pixel correspondence could be one to zero (where there are no identified corresponding image pixels of the planar facade image), one to one (where there is one identified corresponding image pixel of the planar facade image), or one to more than one (where there is more than one identified corresponding image pixel of the planar facade image).

Figure 7:
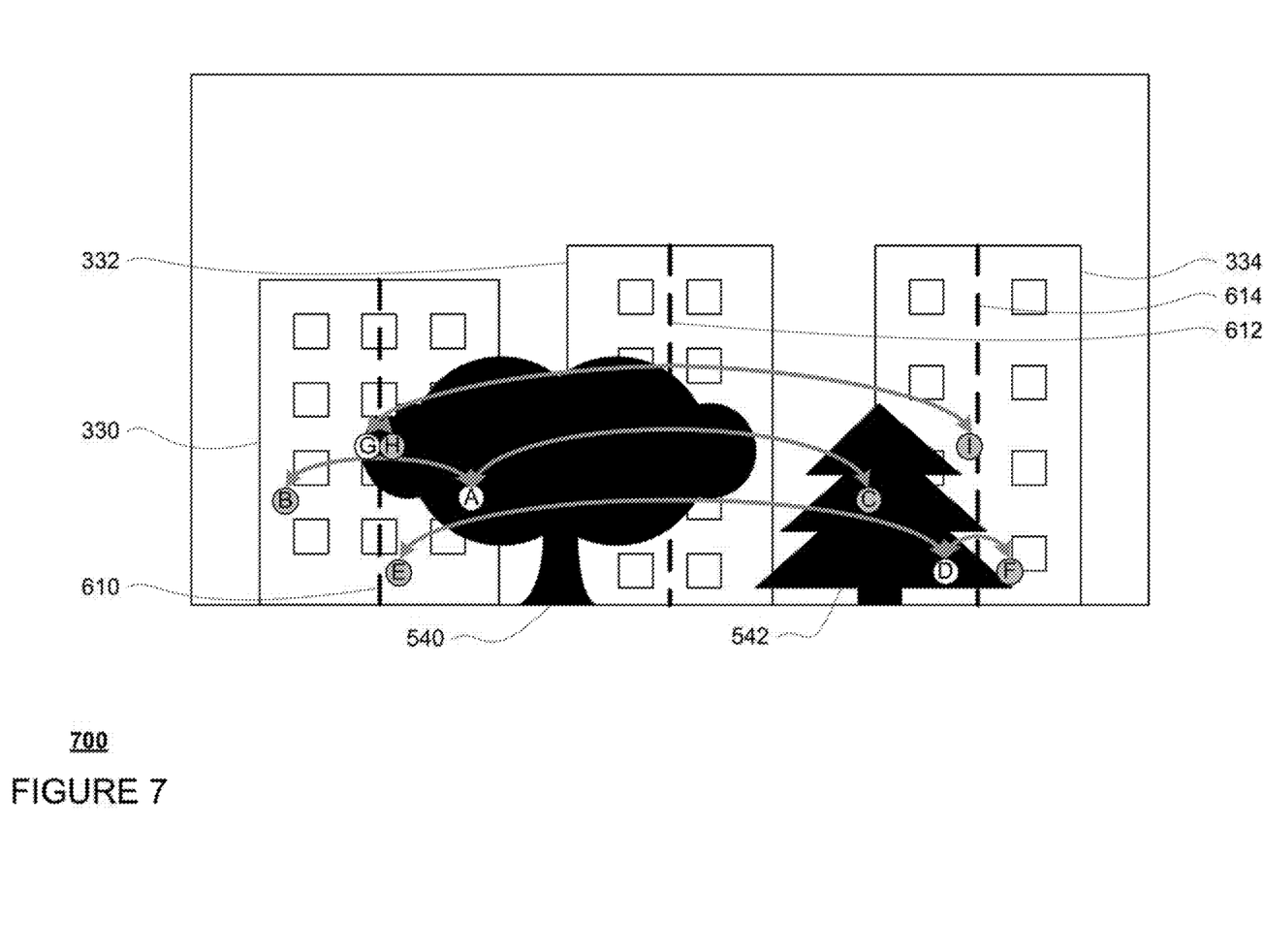
FIG. 7 is an example of pixel correspondences in accordance with aspects of the disclosure.

FIG. 7 is an example of an image 700 corresponding to images 400, 500, and 600 and including pixel correspondence information for three hole pixels, A, C and D. In this example, a corresponding image pixel B is identified for hole pixel A based on the symmetry axis 610. While pixel C is a corresponding pixel identified for hole pixel A based on the symmetry axis 612, pixel C is a hole pixel of area 542, and thus is not a corresponding image pixel for pixel A. Because the corresponding image pixel for hole pixel A for symmetry axis 614 would be outside of the area of image 700, there may be no corresponding image pixel identified for hole pixel A based on symmetry axis 614. Thus, the pixel correspondence for pixel A would be at least one to one. However, if hole pixel C were to be previously filled with other values (color, etc.), hole pixel C may also be identified as a corresponding image pixel for hole pixel A, so the pixel correspondence for pixel A may be one to two.

Similarly, a corresponding image pixel E is identified for hole pixel D based on the symmetry axis 612. In addition, pixel F is a corresponding pixel identified for hole pixel C based on the symmetry axis 614. Because the corresponding image pixel for hole pixel D for symmetry axis 610 would be outside of the area of image 700, there may be no corresponding image pixel identified for hole pixel D based on symmetry axis 610. Thus, the pixel correspondence for pixel A may be one to two.

As another example, while pixel H is a corresponding pixel identified for hole pixel G based on the symmetry axis 610, pixel H is a hole pixel of area 540, and thus is not a corresponding image pixel for pixel I. A corresponding image pixel H is identified for hole pixel G based on the symmetry axis 612. Because the corresponding image pixel for hole pixel G for symmetry axis 614 would be outside of the area of image 700, there may be no corresponding image pixel identified for hole pixel G based on symmetry axis 614. Thus, the pixel correspondence for pixel G may be one to one. Again, if hole pixel H were to be previously filled with other values (color, etc.), hole pixel H may also be identified as a corresponding image pixel for hole pixel G, so the pixel correspondence for pixel G may be one to two.

Rather than determining whether all of the hole pixels are potentially fillable by one or more image pixels and generating the set of pixel correspondences, the computing devices may determine whether there are any holes that cannot be filled and, if not, thereafter identify pixel correspondences as described above. In this example, input_image is an orthographic projection of a planar facade, such as image 500. The input_MASK is a binary image or mask of the same size as input_image identifying hole pixels and non-hole pixel of the binary image, such as binary image 550. As an example, a pixel value of 1 may indicate a hole pixel at the corresponding pixel in input_image, and a pixel value of 0 may indicate a non-hole pixel at the corresponding pixel in inpu_image. In addition, symmetry_axes refers to a set of the identified symmetry axis, each of which establishes a 1:1 correspondence between two subsets of pixels in input_image.

PSEUDO CODE 1:

```
output_mask <- input_mask
do
    update_occurred <- false
    for each axis, a, in symmetry_axes
        for each pixel, p, in output_mask
            if output_mask [p] is 0 then continue
            if (a maps p to some p') and (p' is within
output_mask) and (output_mask [p'] is 0) then
                output_mask [p] <- 0
                update_occurred <- true
            end if
        end for each pixel
    end for each axis
while update_occurred
```

The output of this is a map or mask, output_mask I which a pixel value of 1 may indicate a hole pixel that cannot be filled. If outpu_mask ends up with all zeros, then the pixels of the input_image or the input_mask, are completely fillable.

Figure 8:
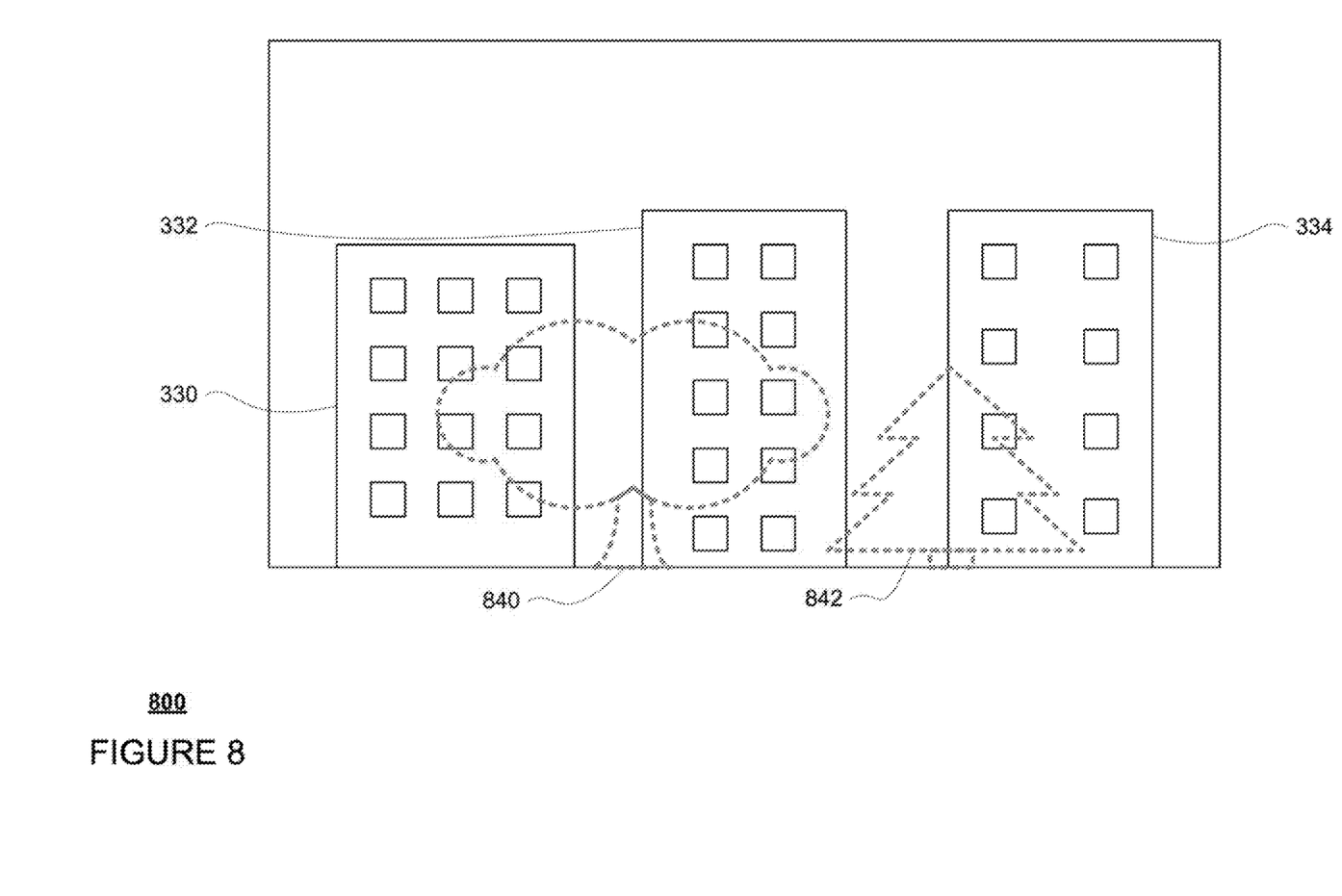
FIG. 8 is an example interpolated image in accordance with aspects of the disclosure.

When each hole pixel can be filled, the pixel correspondences may also be used by the computing devices 110 to carry out the interpolation and provide a final interpolated image. This interpolation may be based on using pixel values (e.g., color values) derived from corresponding image pixels to alter or replace the original pixel color values of the hole pixels. FIG. 8 is an example interpolated image 800 corresponding to images 400, 500, 600 and 700. Thus, in this example, the interpolation appears to "remove" the obstructions of trees 440 and 442 of image 400 and replaces them with new pixel values as shown in areas 840 and 842 of image 800.

In one example, a fast patch-based recursive approach may be used by the computing devices 110. Such an approach may maximize the coverage area of hole-regions via a region-flipping operation with respect to the symmetry axis having the highest strength score. This may provide a greedy, but educated guess at which pixels should be used for the interpolation.

The following is an example pseudo code for patch-based interpolation. In this example, IMAGE_pixels are non-hole pixels of the binary image, HOLE_pixels are hole pixels of the binary image, and HOLE_mask refers to the binary image.

PSEUDO CODE 2:
** Given an image and its associated current HOLE_mask, when there is at least one hole pixel in the current HOLE_mask or current HOLE_mask and previous HOLE_mask differ
sort all symmetry axes in order of maximum HOLE_pixel coverage area on this image (the order is weighted by symmetry axis score and likelihood probability of the overall image pixel region with respect to this reflection symmetry axis)

Fill in the hole using the FIRST symmetry axis in the queue by reflection (flipping the region) update current HOLE_mask
go to **
Otherwise, terminate.

Alternatively, the more computing devices 110 may jointly select the best choice among the available candidates for every hole pixel in order to optimize a cost function that accounts for smoothness of the filled image as well as quality of each candidate. In this regard, the decisions for all hole pixels may be made simultaneously as opposed to each independently of one another. This approach may improve image quality and local regularity when interpolating. As an example, the cost function may include various terms such as distance between corresponding pixels, number of symmetry axes between corresponding pixels, strength of each symmetry axis for each correspondence (inverted), and neighborhood smoothness (from already filled or actual pixel values). The lowest cost corresponding pixel may be selected for the interpolation.

One possible optimization for this problem is a graph cut energy minimization, where the graph nodes correspond to hole pixels and the set of labels for each node corresponds to the available candidates that may be used for interpolation. When different holes have different numbers of candidates, the label sets may be padded to the same size by repeating some of the candidates.

Post-processing steps may also be used by the one or more computing devices to improve the quality of the interpolating as well as the quality of the final interpolated image. For example, techniques such as local smoothness operations or blending as discussed above, shadow removal, and text-inversion may be used to further improve the visual appeal of the final interpolated image.

In the event that there is no corresponding pixel for a given hole pixel or pixels (where the pixel correspondence is one to zero), additional techniques may be used to determine how to fill the given hole pixel or pixels. For example, an image may be processed a second time to identify additional symmetry axes and the other features described above may be repeated. Symmetry axes may be identified from image content, so augmenting image content can lead to finding additional symmetry axes. For instance, a first set of axes may allow completion of windows at various places across a facade, with a symmetry axis for each window or pair of windows. With those complete, a larger scale symmetry between the two halves of the facade may be identified, allowing for interpolation across additional regions other than windows. Alternatively or in addition, other forms of symmetry such as translation or repeating patterns of pixels or interpolation from neighboring pixels may be used to interpolate any given hole pixel or pixels that remain.

In another alternative, in the event that there is no corresponding pixel for a given hole pixel or pixels, the features described above may be used to fill in any hole pixels that do have pixel correspondences. At this point, additional techniques may be used to determine how to fill the given hole pixel or pixels that remain. As with the example above, the partially interpolated image may be processed a second time (after the initial interpolation) to identify additional symmetry axes and the other features described above may be repeated. In some instances, other forms of symmetry such as translation or repeating patterns of pixels or interpolating from neighboring pixels may also be used to fill in any given hole pixel or pixels that remain.

The interpolated images may be used for various purposes. For example, the interpolated image may be provided to client computing devices upon a request for an image of the location of the interpolated image. The interpolated images may also be used to generate 3D models of the location of the interpolated image. As an example, once the images are interpolated, the interpolated pixel values may be projected back to the surfaces of the 3D models to complete the textures of these surfaces. These 3D models may be provided to client computing devices upon a request. Because the obstructions from the interpolated images have been "removed" for a user viewing the interpolated image or 3D model, a user may be provided with a more complete visualization of a scene from different views.

Figure 9:
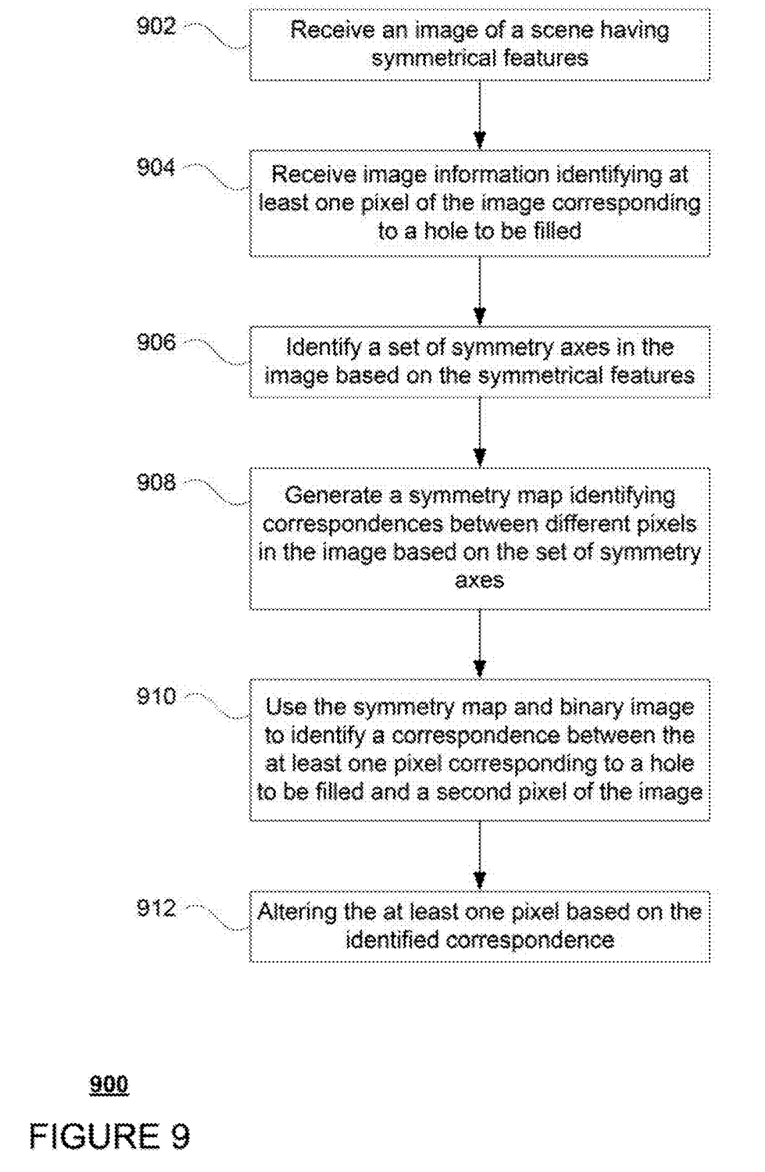
FIG. 9 is an example flow diagram in accordance with aspects of the disclosure.

Flow diagram 900 of FIG. 9D is one example of some of the features described above which may be performed by one or more computing devices such as one or more server computing devices 110, or one or more client computing devices, such as client computing devices 120, 130, and 140. In this example, an image of a scene having symmetrical features is received at block 910. These symmetrical features may include features such as buildings that have symmetrical properties. Image information identifying at least one pixel of the image corresponding to a hole to be filled is received at block 920. This image information may include the binary image identifying hole pixels and image pixels. A set of symmetry axes based on the symmetrical features of the scene is identified at block 930. A symmetry map identifying correspondences between different pixels in the image based on the set of symmetry axes is generated at block 940. A correspondence between the at least one pixel corresponding to a hole to be filled and a second pixel of the image is identified based at least in part on the symmetry map and the image information at block 950. The at least one pixel is then altered based on the identified correspondence at block 960. As noted above, this may include replacing a pixel value of the at least one pixel with a pixel value of the second pixel using the identified correspondence.

Unless stated otherwise, the foregoing alternative examples are not mutually exclusive. They may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. As an example, the preceding operations do not have to be performed in the precise order described above. Rather, various steps can be handled in a different order or simultaneously. Steps can also be omitted unless otherwise stated. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:
1. A method comprising:
receiving, by one or more computing devices, an image of a scene having symmetrical features;
receiving, by the one or more computing devices, image information identifying at least one pixel of the image corresponding to an obstruction in the image;
identifying, by the one or more computing devices, a set of symmetry axes based on the symmetrical features of the scene;

generating, by one or more computing devices, a symmetry map identifying correspondences between different pixels in the image based on the set of symmetry axes;

identifying, by the one or more computing devices, a correspondence between the at least one pixel and a second pixel of the image based at least in part on the symmetry map and the image information; and altering, by the one or more computing devices, the at least one pixel based on the identified correspondence in order to provide an output image where the obstruction appears to be at least partially removed from the image.

2. The method of claim 1, wherein the image being an orthographic view of a portion of the scene.

3. The method of claim 1, wherein each given symmetry axis of the set of symmetry axes is associated with a confidence value indicating a confidence in the given symmetry axis, and identifying the correspondence is further based on the confidence value.

4. The method of claim 1, further comprising:
using the symmetry map and image information to identify a correspondence between the at least one pixel and a third pixel of the image; and
before altering the at least one pixel corresponding to a hole to be filled, selecting the second pixel over the third pixel based on a first symmetry axis of the set of symmetry axes associated with the first correspondence and a symmetry axis of the set of symmetry axes associated with the second correspondence.

5. The method of claim 4, wherein each given symmetry axis of the set of symmetry axes is associated with a strength score indicating a confidence in the given symmetry axis and the selecting is further based on the strength scores of the first symmetry axis and the second symmetry axis.

6. The method of claim 4, wherein selecting is further based on (1) a first number of symmetry axes of the set of symmetry axes between the at least one pixel and the second pixel in the image and (2) a second number of symmetry axes of the set of symmetry axes between the at least one pixel and the third pixel in the image.

7. The method of claim 4, wherein selecting is further based on a color of a neighboring pixel of the at least one pixel corresponding to a hole to be filled.

8. The method of claim 1, further comprising:
using the symmetry map and the image information to identify a correspondence between the at least one pixel and a third pixel of the image;
before altering the at least one pixel corresponding to a hole to be filled, selecting the second pixel over the third pixel using a cost-function and graph cut energy minimization.

9. The method of claim 1, wherein the altering includes using the color of the second pixel to fill the at least one pixel.

10. The method of claim 1, wherein identifying the set of symmetry axes includes identifying symmetry axes that are either horizontal or perpendicular to a gravity gradient for the image.

11. The method of claim 1, wherein the symmetry map is generated as a probability map based on a dense pixel-wise analysis of the image with respect to each symmetry axis of the set of symmetry axes.

12. The method of claim 1, wherein the symmetry map is generated such that the symmetry map identifies:
whether any holes of the image information can be filled;
for each pixel of the image a number of pixel correspondences to different pixels in the street level image; and
for each pixel of the image a location of any corresponding pixel and a likelihood value for any corresponding pixels, wherein each likelihood value indicates a strength of the correspondence.

13. The method of claim 1, wherein the image information includes a binary image where binary values of the binary image identify the at least one pixel.

14. The method of claim 1, wherein the at least one pixel corresponds to a hole to be filled and at least one pixel is altered by interpolating a pixel value for the at least one pixel in the output image based on the correspondence.

15. The method of claim 1, further comprising using the at least one altered pixel to complete a texture of a surface of a 3D model of the scene.

16. A system comprising one or more computing devices configured to:
receive an image of a scene having symmetrical features;
receive image information identifying at least one pixel of the image corresponding to an obstruction in the image;
identify a set of symmetry axes based on the symmetrical features of the scene;
generate a symmetry map identifying correspondences between different pixels in the image based on the set of symmetry axes;
identify a correspondence between the at least one pixel and a second pixel of the image based at least in part on the symmetry map and the image information; and
alter the at least one pixel based on the identified correspondence in order to provide an output image where the obstruction appears to be at least partially removed from the image.

17. The system of claim 16, wherein the one or more computing devices are further configured to:
use the symmetry map and image information to identify a correspondence between the at least one pixel and a third pixel of the image; and
before altering the at least one pixel corresponding to a hole to be filled, select the second pixel over the third pixel based on a first symmetry axis of the set of symmetry axes associated with the first correspondence and a symmetry axis of the set of symmetry axes associated with the second correspondence.

18. The system of claim 16, wherein each given symmetry axis of the set of symmetry axes is associated with a strength score indicating a confidence in the given symmetry axis and the one or more computing devices are further configured to select the second pixel over the third pixel further based on the strength scores of the first symmetry axis and the second symmetry axis.

19. The system of claim 16, wherein the one or more computing devices are further configured to select the second pixel over the third pixel further based on (1) a first number of symmetry axes of the set of symmetry axes between the at least one pixel and the second pixel in the image and (2) a second number of symmetry axes of the set of symmetry axes between the at least one pixel and the third pixel in the image.

20. A non-transitory, tangible machine readable medium on which instructions are stored, the instructions, when executed by one or more processors, cause the one or more processors to perform a method, the method comprising:
receiving an image of a scene having symmetrical features;
receiving image information identifying at least one pixel of the image corresponding to an obstruction in the image;
identifying a set of symmetry axes based on the symmetrical features of the scene;

generating a symmetry map identifying correspondences between different pixels in the image based on the set of symmetry axes;

identifying a correspondence between the at least one pixel and a second pixel of the image based at least in part on the symmetry map and the image information; and altering the at least one pixel based on the identified correspondence in order to provide an output image where the obstruction appears to be at least partially removed from the image.

* * * * *